(12) United States Patent
Boyer

(10) Patent No.: US 6,402,438 B1
(45) Date of Patent: Jun. 11, 2002

(54) COMPOSITE CUTTING TOOL

(75) Inventor: Ronald E. Boyer, Millersburg, PA (US)

(73) Assignee: Alvord-Polk, Inc., Millersburg, PA (US)

( * ) Notice: Subject to any disclaimer, the term of this patent is extended or adjusted under 35 U.S.C. 154(b) by 0 days.

(21) Appl. No.: 09/525,594

(22) Filed: Mar. 14, 2000

Related U.S. Application Data

(62) Division of application No. 09/247,470, filed on Feb. 8, 1999, now Pat. No. 6,146,476.

(51) Int. Cl.7 ............................................. B23B 51/02
(52) U.S. Cl. ..................... 408/144; 407/53; 407/118; 408/145; 408/156; 408/227
(58) Field of Search .................................. 408/144, 145, 408/153, 156, 178, 199, 224, 225, 227, 229, 230; 407/53, 54, 118, 119

(56) References Cited

U.S. PATENT DOCUMENTS

| | | | |
|---|---|---|---|
| 52,148 A | 1/1866 | Dow | |
| 1,099,984 A | 6/1914 | Kirsten | |
| 1,524,218 A | 1/1925 | Smith et al. | |
| 1,847,302 A * | 3/1932 | Emmons ..................... | 408/144 |
| 1,887,373 A * | 11/1932 | Emmons et al. ............. | 408/144 |
| 1,908,887 A * | 5/1933 | Breeler et al. .............. | 408/144 |
| 1,939,991 A | 12/1933 | Krussell ....................... | 51/206 |
| 2,361,492 A | 10/1944 | Pare ............................. | 51/298 |
| 2,363,272 A | 11/1944 | Taeyaerts et al. ............. | 125/39 |
| 3,626,644 A | 12/1971 | Cupler, II .................... | 51/288 |
| 3,819,901 A | 6/1974 | Berinde et al. ............... | 219/76 |
| 3,848,104 A | 11/1974 | Locke .................... | 219/121 L |
| 3,952,180 A | 4/1976 | Gnanamuthu ........ | 219/121 LM |
| 4,015,100 A | 3/1977 | Gnanamuthu et al. ...... | 219/121 LM |
| 4,050,840 A * | 9/1977 | Skingle ...................... | 408/144 |
| 4,109,737 A | 8/1978 | Bovenkerk .................. | 175/329 |

(List continued on next page.)

OTHER PUBLICATIONS

Wei et al., "Study of Laser Cladding of 45# Carbon Steel with Buckytube Coating", Chinese Journal of Lasers, 1996, 23 (8) pp. 765–768 (Chinese, with English translation).

Wang et al., "Laser Cladding Coating Against Erosion–Corrosion Wear and its Application to Mining Machine Parts", Wear, 1997, 209 (1–2), pp. 96–100.

Primary Examiner—Daniel W. Howell
(74) Attorney, Agent, or Firm—Thomas Hooker, P.C.

(57) ABSTRACT

A laser beam is directed onto a bonding surface of a steel tool body to form a molten melt pool. Particles of high speed steel alloy are flowed into the melt pool and melt in the melt pool. The laser beam is moved along the bonding surface to form solid lines of high speed steel laser cladding metallurgically bonded to the cutter portion at the bonding surface and to each other. The cladding is abraded to form the cutting edge of a composite cutting tool.

39 Claims, 6 Drawing Sheets

U.S. PATENT DOCUMENTS

| | | |
|---|---|---|
| RE29,815 E | 10/1978 | Gnanamuthu ......... 219/121 LM |
| 4,122,240 A | 10/1978 | Banas et al. ................. 428/655 |
| 4,154,565 A | 5/1979 | Hyde et al. .................. 425/369 |
| 4,250,372 A | 2/1981 | Tani ...................... 219/121 LE |
| 4,269,868 A | 5/1981 | Livsey ....................... 427/53.1 |
| 4,274,769 A | 6/1981 | Multakh ...................... 408/145 |
| 4,299,860 A | 11/1981 | Schaefer et al. ............ 427/53.1 |
| 4,300,474 A | 11/1981 | Livsey ......................... 118/641 |
| 4,323,756 A | 4/1982 | Brown et al. .......... 219/121 LF |
| 4,373,593 A | 2/1983 | Phaal et al. .................. 175/329 |
| 4,437,800 A | 3/1984 | Araki et al. ................. 407/119 |
| 4,459,458 A | 7/1984 | Vetsch et al. ................ 219/121 |
| 4,507,538 A | 3/1985 | Brown et al. ............ 219/121 L |
| 4,608,226 A | 8/1986 | Lauvinerie et al. ............. 419/5 |
| 4,638,145 A | 1/1987 | Sakuma et al. ......... 219/121 LU |
| 4,644,127 A | 2/1987 | LaRocca .............. 219/121 FS |
| RE32,380 E | 3/1987 | Wentorf, Jr. et al. ........ 407/119 |
| 4,705,933 A | 11/1987 | van Bennekom et al. ... 219/121 LC |
| 4,724,299 A | 2/1988 | Hammeke ............... 219/121 L |
| 4,731,296 A | 3/1988 | Kikuchi et al. .............. 428/552 |
| 4,743,733 A | 5/1988 | Mehta et al. .......... 219/121 LF |
| 4,784,023 A | 11/1988 | Dennis ...................... 76/108 A |
| 4,814,575 A | 3/1989 | Petitbon ................. 219/121.64 |
| 4,884,476 A | 12/1989 | Okuzumi et al. .......... 76/101 R |
| 4,972,912 A | 11/1990 | Keshavan ................... 174/329 |
| 4,980,534 A | 12/1990 | Okamoto et al. ........ 219/121.6 |
| 4,991,467 A | 2/1991 | Packer ...................... 76/108.6 |
| 5,020,394 A | 6/1991 | Nakamura et al. .......... 76/108.6 |
| 5,031,484 A | 7/1991 | Packer ...................... 76/108.6 |
| 5,070,748 A | 12/1991 | Packer ...................... 76/108.6 |
| 5,106,674 A | 4/1992 | Okada et al. ............... 428/217 |
| 5,111,021 A | 5/1992 | Jolys et al. ............... 219/121.6 |
| 5,115,697 A | 5/1992 | Rodriguez et al. ......... 76/108.6 |
| 5,123,217 A | 6/1992 | Ishikawa et al. .......... 51/206 R |
| 5,139,372 A | 8/1992 | Tanabe et al. .............. 407/118 |
| 5,155,325 A | 10/1992 | McCleaf et al. ....... 219/121.64 |
| 5,158,405 A | 10/1992 | Serafin ........................ 408/1 R |
| 5,159,857 A | 11/1992 | Jureqicz .................... 76/108.2 |
| 5,160,556 A | 11/1992 | Hyde et al. ................. 148/525 |
| 5,213,452 A | 5/1993 | Kirby ........................... 407/42 |
| 5,226,760 A | 7/1993 | Nishimura ................... 407/54 |
| 5,247,923 A | 9/1993 | Lebourg .................. 125/23.01 |
| 5,272,940 A | 12/1993 | Diskin ....................... 76/108.6 |
| 5,425,288 A | 6/1995 | Evans ....................... 76/108.2 |
| 5,431,072 A | 7/1995 | Christoffel .................... 76/115 |
| 5,438,441 A | 8/1995 | Rockstroh et al. .......... 359/15 |
| 5,443,337 A | 8/1995 | Katayama ................... 408/145 |
| 5,477,026 A | 12/1995 | Buongiorno ........... 219/121.84 |
| 5,484,330 A | 1/1996 | Flood et al. ................. 451/540 |
| 5,743,346 A | 4/1998 | Flood et al. ............. 175/420.2 |
| 6,146,476 A | * 11/2000 | Boyer ........................ 148/525 |
| 6,158,304 A | * 12/2000 | Packers et al. ............. 408/144 |

\* cited by examiner

COMPOSITE CUTTING TOOL

This is a division of U.S. application Ser. No. 09/247,470 Feb. 3, 1999 now U.S. Pat. No. 6,146,476.

FIELD OF THE INVENTION

The invention relates to cutting tools and methods of making cutting tools.

BACKGROUND OF THE INVENTION

Cutting tools cut selected material from workpieces during machining operations. Examples of cutting tools include twist drills, router bits, reamers, broaches, end bores, counter bores, milling cutters and end mills. Cutting tools may cut any material including metal, wood, stone, plastic, composites, fiberglass, and the like.

Cutting tools have a tool body having a mounting portion for mounting in a machine tool and a cutting portion. The cutting portion typically includes cutters away from the mounting portion. Cutters have exposed cutting edges at their outer edges. Moving the tool body forces the cutting edges into the workpiece, cutting away material and removing the cut material from the workpiece.

A cutting tool operates under extreme conditions. Large forces and high pressures are generated during cutting. The cutting edges often become red-hot. Cutting tools may be sprayed with liquids for cooling or to aid cutting. The workpiece may be made from a hard or highly abrasive material that rapidly dulls the tool's cutting edges.

Cutting tools must be both hard and tough. Cutting edges should be as hard as possible to cut into the workpiece and resist dulling. The cutting edges should also be heat resistant to maintain cutting ability and not wear excessively at high temperature. Yet the tool body needs to be rigid and tough. To assure accurate cuts, the tool body must not excessively bend or flex during machining. The tool mounting portion must be sufficiently tough to be held by a machine tool and to resist breakage. If the tool breaks an expensive workpiece may be destroyed, production time is wasted, and operator safety may be at risk.

Cutting tools are conventionally made from tool steel or high speed steel bodies. Special alloy steels are used. The steel is sufficiently hard to form effective cutting edges, yet is sufficiently tough to be held by the machine tool and not break during cutting. The maximum hardness of steel cutting tools is limited. Increasing the hardness of the steel makes the steel more brittle and reduces toughness. The hardness of the steel cutting edges is limited because the steel tool body must not crack or break.

To overcome the compromise between hardness and toughness necessary with steel cutting tools, composite cutting tools have been developed. These include a tool body with cutters fixed to the tool body. The cutting edges of the tool are formed on the cutters. The cutters are made from a hard, temperature-resistant material and the tool body is made from a tough, and less expensive low carbon steel. A composite cutting tool may include a tough, durable tool body carrying hard, temperature-resistant cutters. Composite cutting tools can cut through harder materials more quickly and for a longer time without dulling than non-composite steel cutting tools.

One known composite cutting tool includes a steel tool body with a hard plated coating. The coating usually covers the entire cutting edge portion of the tool. Another known composite cutting tool includes cutters made with hard inserts brazed or mechanically fastened to a steel tool body. The inserts are sharpened to form the cutting edges.

Known composite cutting tools have disadvantages. Plated tools have very thin coatings. The coating usually ranges from two ten-thousandths of an inch (0.0002 inch) to five thousandths of an inch thick (0.005 inch). The coating is so thin that pregrinding removes the plating so the tool cannot be resharpened. The entire cutter area is plated, wasting expensive plating material. Brazing or mechanical fastening of cutters to the tool body is time consuming, labor intensive, and requires expensive machining of the tool body. The brazed joint between the cutter and the tool body is prone to fail during cutting, destroying the tool, potentially destroying the workpiece along with it, and risking operator injury.

Thus, there is a need for an improved cutting tool. The cutters should be bonded securely to the tool body, and be sufficiently thick to allow the cutting edges to be finished ground when manufactured and to be resharpened. The tool body should be made from relatively inexpensive but tough metal which can be reliably held by a machine tool and does not crack or break during use.

SUMMARY OF THE INVENTION

The present invention is directed to an improved cutting tool having an inexpensive low carbon steel or low grade high speed steel body and high speed steel cutters. The cutters are integrally bonded to the tool body and can be resharpened when dulled. The cutters may be a composite having a high speed steel matrix surrounding particles of highly abrasive materials including diamonds, and tungsten and titanium carbides. High speed steel cutter bodies without abrasive particles may be hardened. Expensive machining of the tool body to receive the cutters is not required and the improved cutting tool makes efficient use of materials.

An integral cutting tool having features of the present invention includes a tool body having a mounting portion for being mounted in a machine tool and one or more cutters formed from a body of cladding material metallurgically bonded to the tool body. Cutting edges are formed in the cladding.

The cladding material is joined to the tool body using a cladding machine. A laser beam impinges the tool body and cladding powder is flowed onto the impingement area. The laser beam melts the cladding powder and forms a pool of molten cladding material. The laser beam traverses the tool body, moving the impingement area and depositing a line of cladding on the tool body to form a cutter. Molten cladding left behind the moving laser beam solidifies and is metallurgically bonded to the tool body. The cladding is made typically from powdered high speed steel alloy. Particles of very hard materials may be added.

Laser bonded high speed steel cladding is not hard. The cladding is in a semi-hard condition. In order to harden the cladding it is necessary to fully anneal the cladding and then heat treat the cladding to harden the cladding. After heat treating, the hardened cladding is machined, conventionally using an abrasive wheel, to a desired shape and a cutting edge is formed. The mounting portion of the tool is not hardened and retains its desired toughness.

Where the cladding includes abrasive particles, the cladding need not be annealed and heat treated. Rather, this cladding is hard, is machined to the desired dimension and is provided with a desired cutting edge, typically using an abrasive wheel.

Integral cutting tools with clad cutters have a number of advantages over conventional cutting tools. The cutters are metallurgically bonded to the tool body and do not separate during cutting. The cutters are sufficiently thick to permit resharpening. The tool body does not require special machining to receive and hold the cutters. The cladding is deposited only where the cutters are needed, making efficient use of cladding materials. The mounting portion is tough, easily held and resists breakage.

Other objects and features of the invention will become apparent as the description proceeds, especially when taken in conjunction with the accompanying drawings illustrating the invention, of which there are six sheets and eight embodiments.

DESCRIPTION OF THE PREFERRED EMBODIMENT

Figure 1:
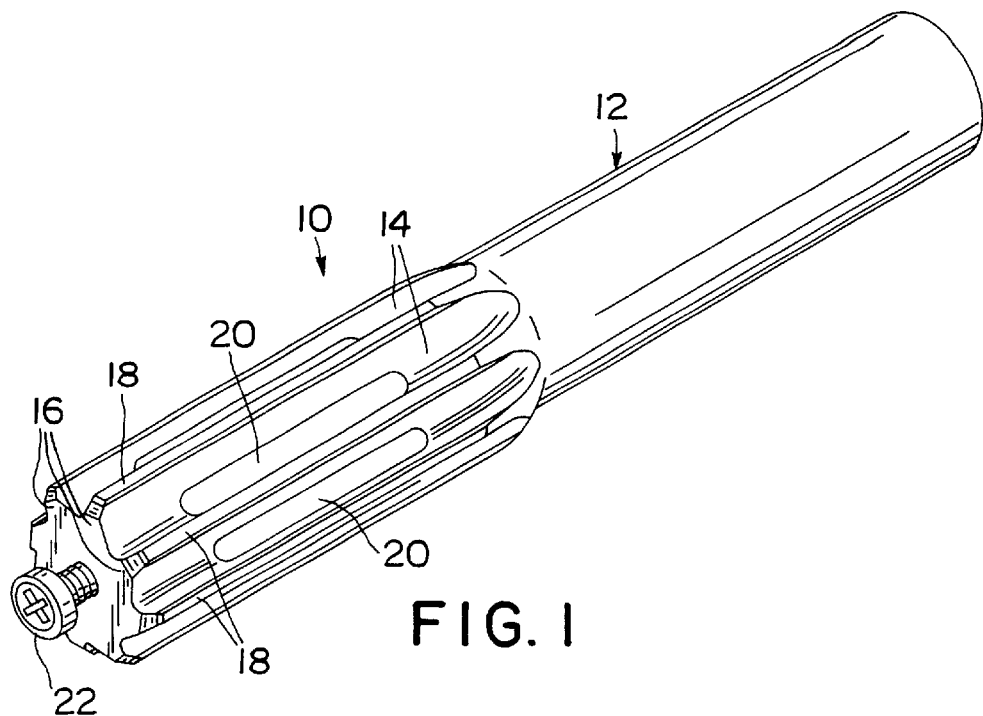
FIG. 1 is a perspective view of an expansion reamer in accordance with the present invention.
Figure 2:
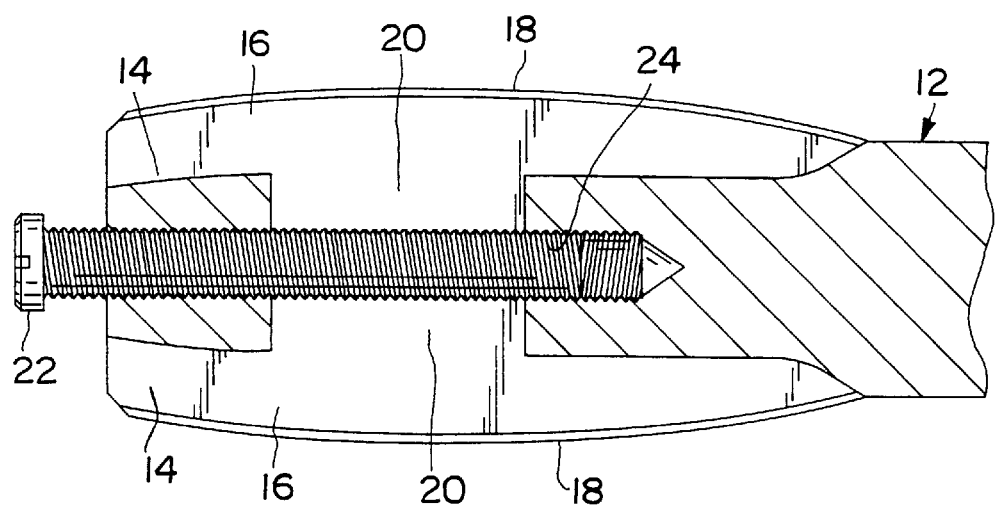
FIG. 2 is a sectional view of the working end of the expansion reamer of FIG. 1.

FIGS. 1 and 2 illustrate a composite expansion reamer 10 in accordance with the present invention. Reamer 10 is used for enlarging or finishing drilled holes. Reamer 10 includes a generally cylindrical, elongate tool body 12 having longitudinal valleys or flutes 14 between longitudinal lands 16. Integral cutters 18 are formed from cladding material and metallurgically bounded to the tops of the lands. Expansion slots 20 are formed in the bottoms of valleys 14. A tapered mandrel 22 is threaded into a threaded bore 24 of tool body 12 to set the diameter of the finished hole. The expansion of the reamer is exaggerated in FIG. 2.

Figure 3:
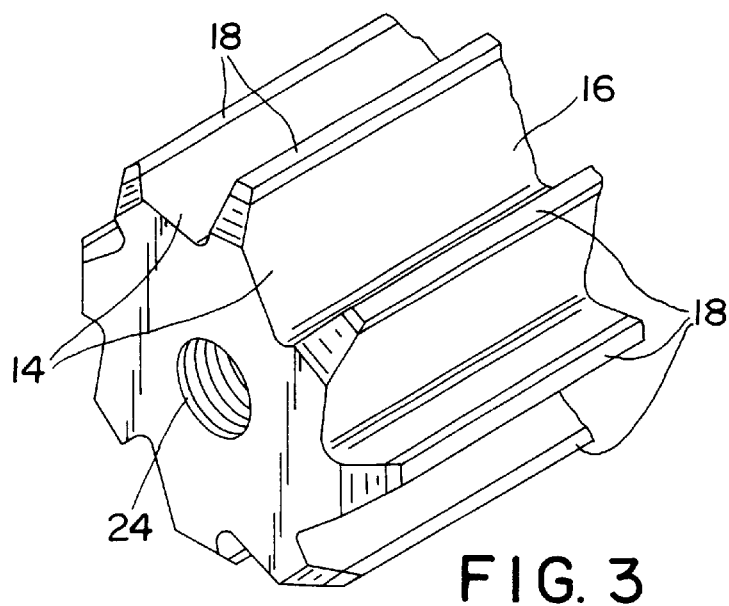
FIG. 3 is a perspective view of a portion of the working end of the expansion reamer of FIG. 1.
Figure 4:
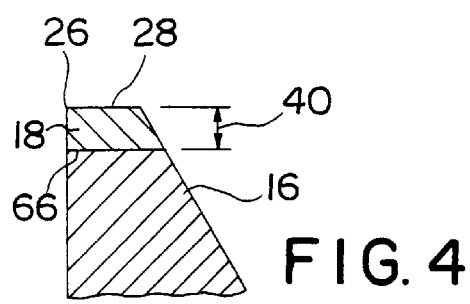
FIG. 4 is an enlarged vertical sectional view through a cutter and land of the expansion reamer of FIG. 1.
Figure 5:
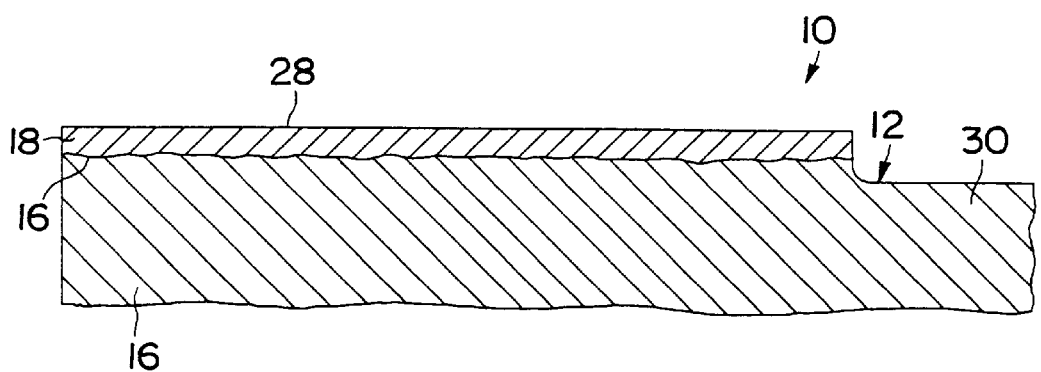
FIG. 5 is an axial sectional view of the cutter and land shown in FIG. 4.

FIGS. 3–5 illustrate cutters 18 bonded to tool body 12. Each cutter 18 is bonded to a land 16. Cutters 18 are made from bodies of hard cladding material particularly suited for cutting. A cutting edge 26 is formed or profiled on each cutter. Radial outer surfaces 28 of cutters 18 can be relieved in a conventional manner to properly dimension the reamer.

Figure 6:
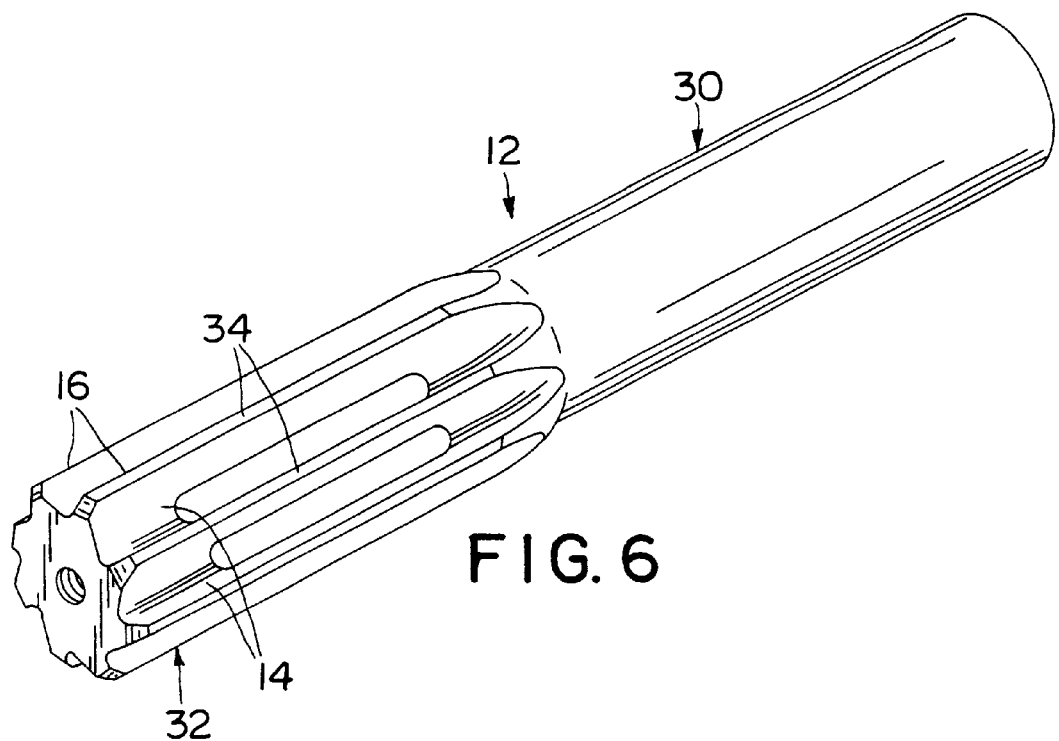
FIG. 6 is a perspective view of the tool body of the expansion reamer of FIG. 1 prior to cladding the tool body.

FIG. 6 illustrates tool body 12 prior to bonding cutters 18 to lands 16. Tool body 12 is made of inexpensive, tough and relatively soft low carbon steel alloy or low grade high speed steel alloy. Low carbon steel alloy has a carbon content of about 0.6 percent or less. Low grade high speed steel alloy has a carbon content greater than the carbon content of low carbon steel alloy and less than about 0.9 percent. Low grade high speed steel alloy generally contains a low concentration of alloy constituents such as molybdenum, vanadium, chromium, nickel and the like.

The body 12 includes a mounting portion or shank 30 at one end of the body and a cutting portion 32 at the other end of the body. The cutting portion include lands 16 and bonding surfaces 34 on the tops of lands 16 for bonding cutters 18 to tool body 12. Mounting portion 30 is adapted to be held in a machine holder (not shown) in a conventional manner.

Each cutter 18 is formed from a body of cladding 36 metallurgically bonded to surface 34 of a land 16. Cladding 36 is bonded to surface 34 using methods described below. FIGS. 7–10 illustrate cladding 36 bonded to surfaces 34. Cladding 36 typically has a thickness 38 of between about 0.020 inches to 0.060 inches. The thickness of cladding shown in the drawing is exaggerated for clarity. Preferably cladding 36 is sufficiently thick to allow resharpening of the subsequently formed cutter 18. A minimum cutter thickness 40 of between about 0.010 inches to 0.020 inches is generally required to allow resharpening of a cutter. See FIG. 4.

Figure 10:
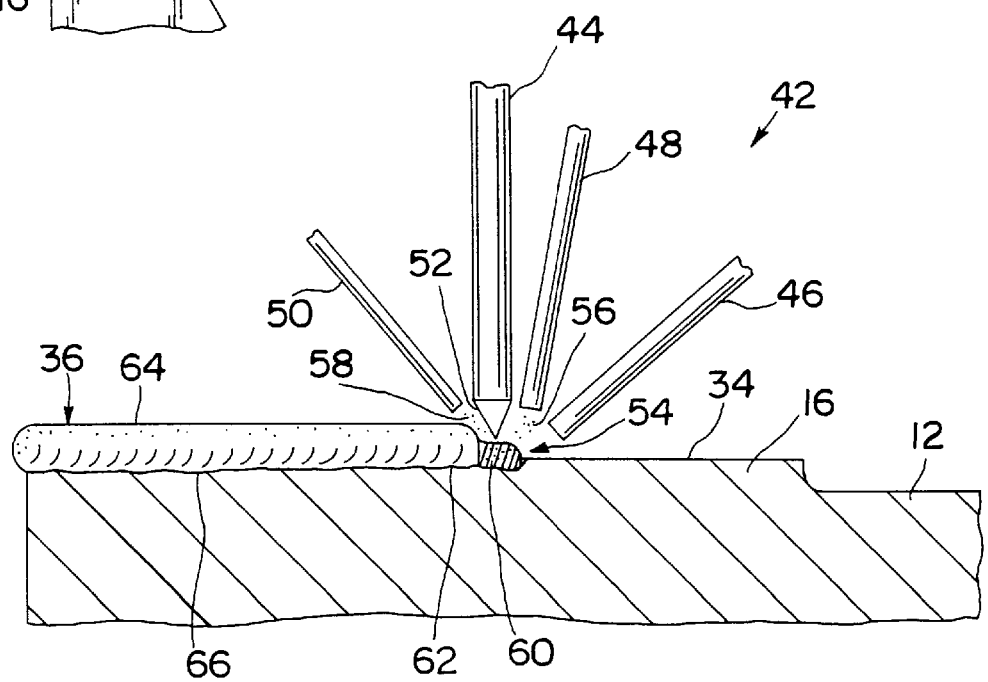
FIG. 10 is a sectional view through a land of the tool body of FIG. 6 illustrating laser cladding the land.

FIG. 10 illustrates providing of bonding surface 34 with cutter cladding 36. A cladding machine 42 includes a laser light beam source 44, an inert gas tube source 46, a cladding powder delivery tube 48, and an abrasive delivery tube 50 for crushed diamonds or tungsten or titanium carbide particles. Cladding machine 42 may be a Model HP-115 CL CNC Cladding System available from Huffman Corporation, of Clover, S. C.

Cladding 36 is bonded on each bonding surface 34. Laser beam source 44 generates a laser beam 52 that impinges against surface 34, defining a impingement area 54 on surface 34. Laser beam 52 heats area 54 to a high temperature between about 3,600° F. and 4,200° F. Inert gas tube 46 flows an inert gas, for example argon, over the laser heated impingement area 54 to prevent oxidation. Cladding powder delivery tube 48 flows a stream of cladding particles 56 onto laser impingement area 54. Delivery tube 50 may flow a stream of abrasive particles 58 onto laser impingement area 54. Laser beam 52 melts cladding particles 56 and the top of surface 34 to form a melt pool 60 of molten material with abrasive particles 58, if provided, in the pool. Subsequent cladding powder and abrasive particles are directed into the pool. The beam and tubes are moved along the land 16.

Movement of laser beam 52 along land 16 causes the laser impingement area 54 to move along bonding surface 34, and moves the molten pool 60 along with it. The molten cladding material, melted material from surface 34 and optional abrasives particles left behind cool, metallurgically bond with the underlying tool body portion 62 and solidify to form a line of cladding 64. The fusion of the cladding material and tool body portion 62 forms an extremely strong metallurgical bond 66 that permanently bonds the cladding 64 to tool body 12.

Figure 7:
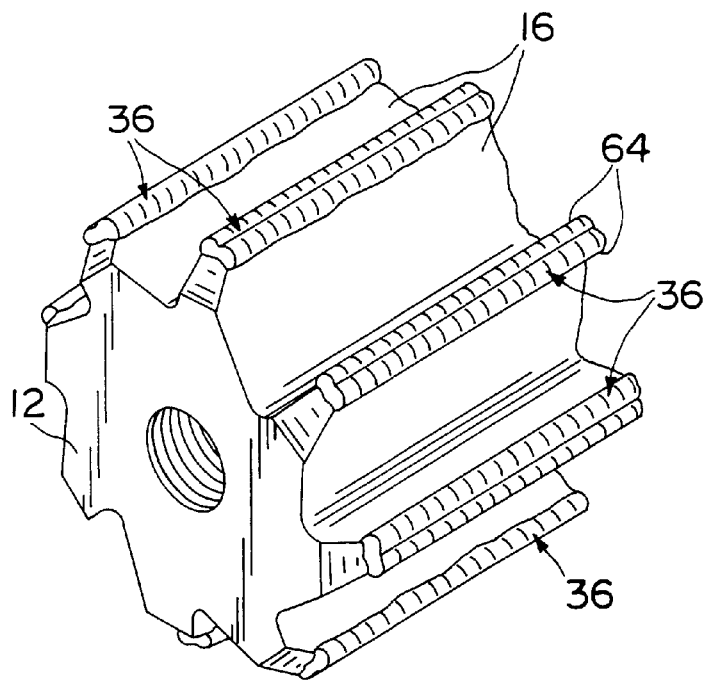
FIG. 7 is similar to FIG. 3 but with side-by-side lines of cladding prior to forming cutters of the expansion reamer.
Figure 8:
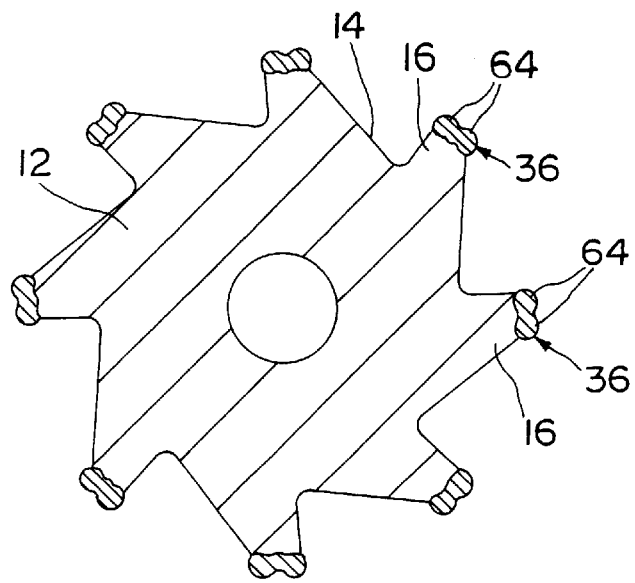
FIG. 8 is a vertical sectional view of the tool blank shown in FIG. 7.
Figure 9:
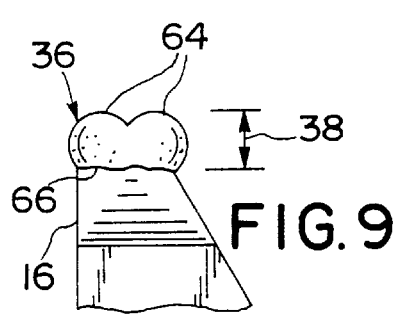
FIG. 9 is an enlarged end view of a land with the side-by-side cladding lines of FIG. 7.

The high speed steel particles delivered to the impingement area melt into pool 60. The abrasive particles, if provided, do not melt in the pool. The molten pool is comprised almost entirely of melted high speed steel which mingles with the melted low grade steel from bonding surface 34. The lower grade bonding surface steel defuses into the melted high speed steel and has a decreasing concentration away from surface 34. The portion of the cladding away from the surface 34 is essentially entirely high speed steel. The cladding material cools to form a cladding line 64 which is typically generally cylindrical, up to 0.060 inches thick and 0.060 inches wide and extends above the bonding surface 34 of land 16. The width and thickness of cladding line 64 can be adjusted to meet design requirements. The path of cladding line 64 is defined by the movement of laser beam 52. As shown in FIGS. 7–9, two cladding lines 64 are formed on and extend longitudinally along land 16. The lines are metallurgically bonded to the land and to each other. In other embodiments, cladding lines 64 may be curved or may include straight and curved portions, depending upon the shape of the supporting land.

Laser beam 52 follows paths along the bonding surface 34 to clad the entire surface with joined, side-by-side lines of cladding 64. As shown in FIG. 9, cladding lines 64 are spaced sufficiently close together so that the total cladding has sufficient size to subsequently form a cutter 18. The path and number of cladding lines 64 can vary depending on the desired shape of the cutter. For example, a smaller diameter reamer may require only one cladding line 64 to form a cutter. A larger diameter reamer may require three or more side-by-side cladding lines for each cutter.

Figure 11:
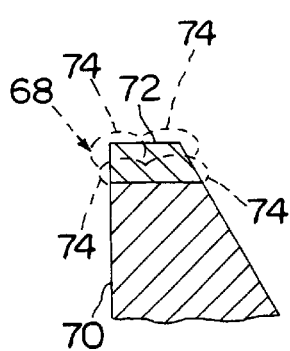
FIG. 11 is a an enlarged vertical sectional view through a cutter and land of a second embodiment expansion reamer, the cutter formed from superimposed layers of side-by-side lines of cladding.

If desired, cladding lines may also be superimposed and metallurgically bonded to one another to increase the cladding thickness. FIG. 11 illustrates a cutter 68 formed on land 70 with cladding 72 that includes two superimposed layers of side-by-side lines of cladding 74. The cladding is shown in phantom lines. Multi-line cladding is free of voids to assure forming a continuous cutting edge. Tool body 12 is a heat sink and solidifies molten cladding quickly. Three layers of cladding have been clad on a tool body without having to pause to cool deposited cladding before adding another layer. If a fourth or additional layer of cladding is required, the previously deposited cladding layers should be allowed cool to about room temperature before applying the additional cladding layer. It is believed that as cladding layers are superimposed on one another, the tool body becomes less effective as a heat sink. Cooling limits thermal distortion of the deposited cladding layers. Less heat generated by the laser beam flows into the tool body and remaining heat remains in the cladding. The likelihood of permanent thermal deformation of the cladding increases as heat is retained in the cladding. Cooling a preceding cladding layer allows adding a new layer and more heat to be stored in the cooled cladding without thermal deformation. The number of cladding layers that can be clad on the tool body before cooling is required will vary with the size of the tool body and type and size of the cladding.

During cladding, the high speed steel particles forming cladding 64 are melted and then cooled, as described, forming a layer of heat treatable high speed steel alloy metallurgically bonded to the tool body. If abrasive particles are added to the cladding during bonding then these particles harden the cladding, which serves as a matrix holding the particles, and it is not necessary to harden the cladding proper. The abrasive particles in the cladding provide the hardness required for cutting. Tool bodies with cladding containing abrasive particles may be finished to desired shape as shown in FIG. 11 after cladding. Abrasive wheels are used to shape the lines of cladding and form two surfaces intersecting at a sharp cutting edge.

Cladding may be formed without abrasive particles. In this case, the applied cladding is in a semi-hard condition at about 25 to 20 Rockwell C and is unsuitable for cutting. Tools with this cladding must be heat treated to harden the cladding. Heat treating is performed by first annealing the cladding to return the alloy to its base metallurgy. The cutting portion 32 is also annealed. Then, the cladding and cutting portion are heat treated to harden the cladding.

One way of annealing applied cladding is to place the cutting portion of the clad tool in a molten boride salt maintained at a temperature of about 1,700° F. for about two hours. Then, the portion is slowly cooled by reducing the furnace temperature to about 1,300° F. The tool is then transferred to boride salt at about 1,000° F. When the part is cooled to 1,000° F. the temperature is below the transfer range and the cladding is acceptably soft and in condition to be hardened by a conventional heat treating process. The heat treating process used depends upon the nature of the high speed steel alloy in the cladding and is conventional. The cutting portion may be heat treated. After the cladding has been hardened by heat treating, the cladding is shaped, preferably by an abrasive wheel to form the desired cutting edge. The mounting portion of the tool is not heat treated and maintains its desired toughness.

Cladding may be used to repair a cutting tool where a cutting edge has been broken or chipped away. In such an application, an appropriate depth cladding is laser applied to the broken away portion of the cutting tool sufficient to replace the broken away metal as previously described. Abrasive particles may be added as required. If particles are not added, then the cladding is fully annealed and heat treated as described. The cladding with abrasive particles or heat treated cladding without abrasive particles in then shaped by a wheel to form a cutting edge.

Applied cladding formed from particles of high speed steel is semi-hard, having a hardness of about 25–30 Rockwell C. When fully annealed, the cladding has a reduced hardness equivalent to that of low carbon steel, about 20 Rockwell C. Heat treating of the fully annealed cladding increases the cladding hardness to about 63 to 68 Rockwell C, depending upon the alloy of the cladding and the nature of the heat treating process.

Cladding containing carbide particles may have a hardness as great as 1,500 to 2,500 Vickers, which is considerably greater than 68 Rockwell C. Cladding containing diamond particles is harder than cladding containing carbide particles.

Operation of expansion reamer 10 will now be described. Shank 30 is conventionally mounted in a machine tool. The machine tool rotates expansion reamer 10 about the reamer's longitudinal axis. Reamer cutting edges 26 are spaced from the axis and define a cutting diameter of the reamer. Cutting portion 32 of the expansion reamer is inserted into a roughly drilled hole of a workpiece. The hole has an inside diameter less than the cutting diameter of the reamer. As the reamer is moved axially into the hole, cutting edges 26 cut material from the workpiece to produce a finished hole.

The diameter of the finished hole produced by expansion reamer 10 may be adjusted by mandrel 22 in a conventional manner. Tightening tapered mandrel 22 in bore 24 forces cutting portion 32 of tool body 12 to bulge radially outwardly. Lands 16 and cutters 18 assume a convex shape as shown in FIG. 2 where the curvature is exaggerated. The maximum outer diameter at the cutting edges 26 establishes the cutting diameter of cutting portion 32 and the finished diameter of the hole.

As cutters 18 wear, the cutting diameter of cutting portion 32 decreases. The diameter of the finished hole decreases. To compensate for cutter wear, mandrel 22 is further threaded into tapered bore 24 until the outer diameter of work portion 32 expands and returns to the desired finish diameter.

A conventional non-composite expansion reamer is formed from solid high speed steel. The steel is typically heat treated to a hardness of about 63 Rockwell C to 65 Rockwell C. In use, heat treated steel becomes brittle and loses toughness. A non-composite expansion reamer is susceptible to cracking from the forces exerted by the mandrel on the brittle steel.

An expansion reamer made in accordance with the present invention preferably has a mounting portion made from a tough, ductile steel. The portion is sufficiently tough to withstand impact forces that would crack a high speed steel cutting tool, and preferably can be case-hardened as necessary. Preferred body steels include low carbon steels such as Nos. 4140, 1018, 1020 and the like. For example, shank 30 is preferably case-hardened to a hardness of between about 20 to 23 Rockwell C. Case-hardening hardens only the surface of shank 30 and does not reduce the toughness of tool body 12. Low grade tool steel may also be used.

The cutters are formed from high speed steel alloy powder. Grades M-2, M-7 and M-42 alloy powder may be used to make cladding. The hardness of the cutters is not limited by the toughness of the tool body. The cutters can be harder than the cutters of a conventional expansion reamer. The improved expansion reamer can cut more quickly yet expand to a greater diameter and compensate for greater cutter wear than can a conventional expansion reamer.

Cutting edges 26 of expansion reamer 10 are located entirely along cutters 18. The entire cutting edge need not be formed from cladding. Cutting edges located in high wear zones can be formed on cladding in accordance with the present invention. Cutting edges in less demanding wear zones can be formed on the tool body itself in a conventional manner.

FIGS. 12–17 illustrate other cutting tools with cladding on cutting portions of the tool. Each composite cutting tool includes a preform tool body having a mounting portion for mounting the tool in a machine tool and a cutting portion with one or more laser bonded cutters as previously described. Cutting edges are formed on the clad cutters.

Figure 12:
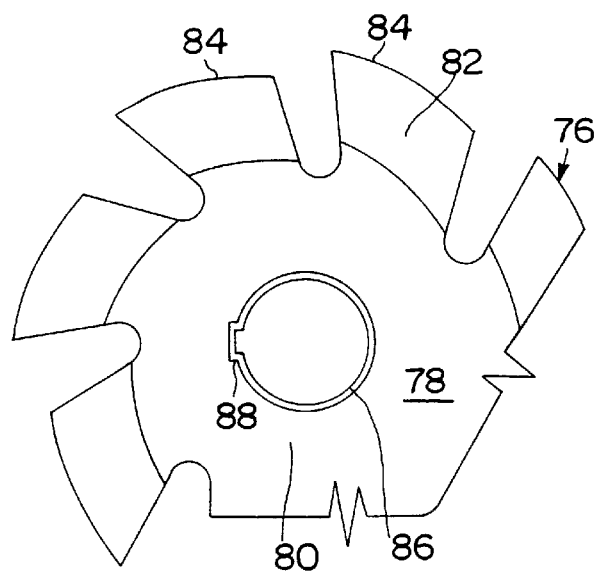
FIG. 12 is a partial view of a milling cutter in accordance with the present invention.

FIG. 12 illustrates a portion of a milling cutter 76 with a generally disc-shaped tool body 78 having an inner radial mounting portion 80 and an outer radial cutting portion 82. Mounting portion 80 surrounds an axis of rotation of milling cutter 76. Cutting portion 82 extends around mounting portion 80. Clad cutters 84 are located at the outer diameter of milling cutter 76 and are spaced around the outer circumference of milling cutter 76. Mounting portion 80 includes an arbor hole 86 and a keyway slot 88 for mounting milling cutter 76 to an arbor of a conventional milling machine. In use, the arbor rotates milling cutter 76 about the arbor's rotational axis for cutting a workpiece.

Figure 13:
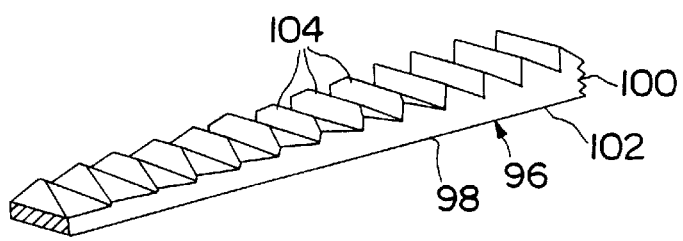
FIG. 13 is a partial view of a broach in accordance with the present invention.

FIG. 13 illustrates a portion of a broach 96 with an elongate tool body 98 having a mounting portion 100 at one end and a cutting portion 102 at the opposite end. Longitudinally spaced cutters 104 are metallurgically bonded to cutting portion 102. The cutters are like the previously described cutters and are bonded and shaped as described. Mounting portion 100 includes a conventionally shaped tang (not shown) that extends longitudinally away from cutting portion 102 for mounting broach 96 in a collet of a conventional broaching machine. In use, a broaching machine moves broach 96 along the longitudinal axis of the broach for enlarging or smoothing a work part.

Figure 14:
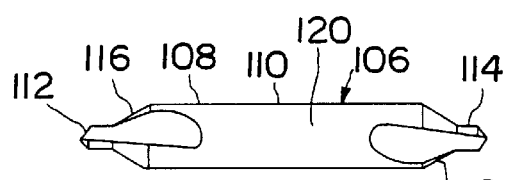
FIG. 14 is a view of a center drill in accordance with the present invention.

FIG. 14 illustrates a center drill 106 having an elongate tool body 108 including a center mounting portion 110 and an oppositely extending cutting portion 112, 114 at each end. Cutters 116, 118 are bonded to cutting portions 112, 114 and shaped as. previously described. Mounting portion 110 includes a cylindrically shaped shank 120 for mounting center drill 106 in the chuck of a conventional drill press. One end of center drill 106 is inserted in the chuck and forms a portion of shank 120 held by the chuck. The other end of center drill 106 extends from the chuck. In use, the drill press rotates center drill 106 about the drill's longitudinal axis for drilling a hole in a workpiece. Center drill 106 can be reversed in the chuck so that the cutters of the drill can be swapped after wear. If desired, one cutting portion 112, 114 and bonded cutters 116, 118 can be eliminated.

Figure 15:
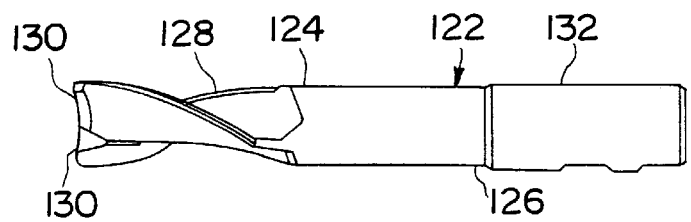
FIG. 15 is a view of an end mill in accordance with the present inventions.

FIG. 15 illustrates an end mill 122 having an elongate tool body 124 including a mounting portion 126 on one end and a helical cutting portion 128 on the opposite end. Cutters 130 of the type described are bonded to cutting portion 128 at the end of tool body 124 and extend radially from the longitudinal axis of end mill 122. Mounting portion 126 includes a shank 132 for mounting end mill 122 in a holder of a milling machine. In use, the milling machine rotates end mill 122 about the mill's longitudinal axis for removing material from a surface of a workpiece. In some embodiments, cutting portions can be formed on each end of the end mill similar to center drill 106.

Figure 16:
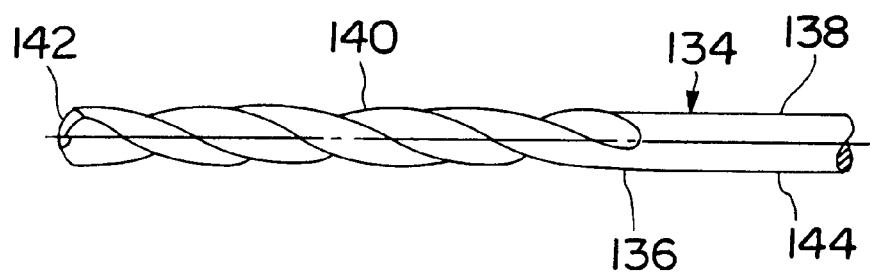
FIG. 16 is a view of a twist drill in accordance with the present invention.

FIG. 16 illustrates a twist drill 134 having an elongate tool body 136 including a mounting portion 138 on one end and a helical cutting portion 140 on the opposite end. Cutters 142 of the type described are bonded to cutting portion 140. Mounting portion 138 includes a cylindrical shank 144 for mounting twist drill 134 in a chuck of a drill press. In use, the drill press rotates twist drill 134 about the drill's longitudinal axis for drilling a hole in a workpiece.

Figure 17:
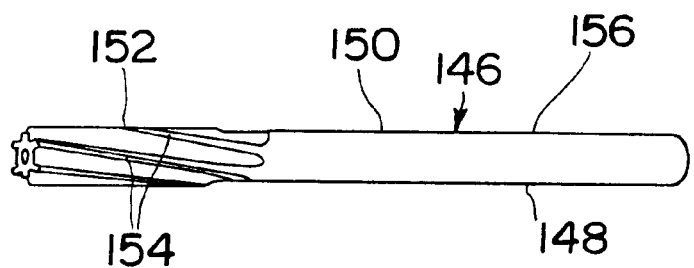
FIG. 17 is a view of a non-expansion reamer in accordance with the present invention.

FIG. 17 illustrates a non-expansion reamer 146 having an elongate tool body 148 including a mounting portion 150 on one end and a cutting portion 152 on the opposite end. Cutters 154 as described are bonded to cutting portion 152. Mounting portion 150 includes a cylindrical shank 156 for mounting reamer 146 in a chuck of a drill press. In use, the drill press rotates reamer 146 about the reamer's longitudinal axis for finishing a hole in a workpiece.

Figure 18:
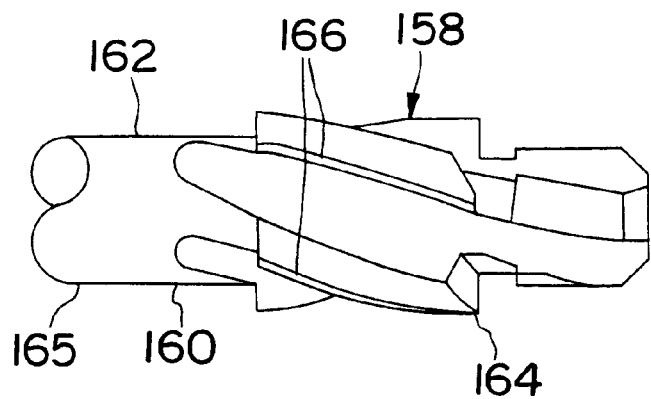
FIG. 18 is a view of a counter bore in accordance with the present invention.

FIG. 18 illustrates a counter bore 158 having an elongate tool body 160 including a mounting portion 162 on one end and a cutting portion 164 on the opposite end. Cutters 166 as described are bonded to cutting portion 164. Mounting portion 162 includes a cylindrical shank 165 for mounting counter bore 158 in a chuck of a drill press. In use, the drill press rotates counter bore 158 about the bore's longitudinal axis for counterboring a workpiece, i.e., boring the end of a hole to a larger diameter.

Composite cutting tools with clad cutters have a number of additional advantages over conventional composite cutting tools. Very accurate numerically controlled cladding machines can automate cladding of the tool body. Expensive machining of the tool body for receiving inserts is eliminated. Conventional steel cutting tools can be used as-is for the tool body, allowing existing non-composite steel cutting tools to be transformed into improved clad laser clad cutting tools.

While I have illustrated and described a preferred embodiment of my invention, it is understood that this is capable of modification, and I therefore do not wish to be limited to the precise details set forth, but desire to avail ourselves of such changes and alterations as fall within the purview of the following claims.

I claim:

1. A composite cutting tool comprising:
   (a) a tool body formed from a metal having a first hardness, said body including a mounting portion and a cutting portion having one or more bonding surfaces; and
   (b) one or more cutters, each cutter formed from metal laser cladding having a second hardness greater than said first hardness, each cutter joined to the tool body at a bonding surface, a solidified melt pool at each bonding surface, each pool including a mixture of said tool body metal and said laser cladding metal and having a greater concentration of said tool body metal adjacent the mounting portion than away from the mounting portion, the laser cladding in each cutter including two formed surfaces intersecting at a cutting edge.

2. The tool as in claim 1 wherein said formed surfaces are abraded.

3. The tool as in claim 2 including a plurality of metal cutters formed from metal laser cladding, each cutter including a cutting edge, all of said cutting edges facing in the same direction.

4. The tool as in claim 3 wherein the mounting portion is cylindrical and said cutting edges are spaced around the mounting portion.

5. The tool as in claim 3 wherein the mounting portion is flat and the cutting edges are spaced on one side of the mounting portion.

6. The tool as in claim 3 wherein the tool body comprises one of: a center bore, a center drill, a twist drill, an end mill, an expansion reamer and a non-expansion reamer.

7. The tool as in claim 2 wherein each cutter includes a plurality of lines of laser cladding and a metallurgical bond between adjacent lines of laser cladding.

8. A composite rotary cutting tool comprising:
   (a) a rotary metal tool body formed from a first alloy of either a low carbon steel or low grade high speed steel, the tool body having a rotary axis and including a cylindrical mounting portion on the axis adapted to be held by a chuck, the mounting portion having a first hardness, and a cutting portion axially spaced from the mounting portion and including one or more bonding surfaces each extending along the axis; and
   (b) one or more shaped metal cutters, each cutter integrally joined to the cutting portion at a bonding surface and formed from high speed steel alloy laser cladding having a second hardness greater than said first hardness, a metallurgical bond between said cladding and the cutting portion at the bonding surface, each cutter including two abraded surfaces extending along the axis and intersecting at a cutting edge extending along the axis, each cutting edge facing in the same circumferential direction around the axis.

9. The tool as in claim 8 wherein cutters have a hardness greater than 63 Rockwell C and said mounting portion has a hardness of between about 20 to about 23 Rockwell C.

10. The tool as in claim 8 including abrasive particles in the laser cladding.

11. The tool as in claim 10 wherein said particles are formed from either a carbide or diamonds.

12. The tool as in claim 8 including a plurality of a elongate metal cutters located radially outwardly of the axis, spaced around the axis and extending along the axis, each such cutter including layers of a plurality of elongate lines of laser cladding extending along the length of one cutter, first metallurgical bonds between the lines of cladding in the layer adjacent the bonding surface and the bonding surface, second metallurgical bonds between the lines of cladding in each layer of lines, and third metallurgical bonds between the lines of cladding in adjacent layers of lines, each cutter bounded by said two abraded surfaces and by a third abraded surface away from the cutting edge.

13. The tool as in claim 12 wherein one of said abraded surfaces and the third surface form extensions of surfaces on the cutting portion adjacent a bonding surface.

14. The tool as in claim 13 wherein the thickness of each cutter above the adjacent mounting surface is equal to or greater than about 0.01 inch.

15. The tool as in claim 8 wherein said first hardness is between about 20 and about 23 Rockwell C, said second hardness is greater than about 63 Rockwell C and the thickness of the cladding in each cutter above the bonding surface is equal or greater than about 0.01 inch.

16. A composite cutting tool comprising:
   (a) a metal tool body formed from a first alloy of either a low carbon steel or low grade high speed steel, the tool body including a mounting portion adapted to be held by a machine tool, and having a first hardness, and a cutting portion including one or more bonding surfaces; and
   (b) one or more metal cutters, each cutter comprising a body of laser cladding and including at least a first line of laser cladding extending along a bonding surface, said laser cladding formed from a high speed steel alloy having a second hardness greater than said first hardness, a solidified melt pool at the bonding surface, the solidified melt pool forming a first metallurgical bond between said laser cladding and the cutting portion, said metallurgical bond including a mixture of said first alloy and said high speed steel alloy and having a greater concentration of said first alloy adjacent the mounting portion than away from the mounting portion, each cutter including two formed surfaces on the laser cladding and intersecting at a cutting edge.

17. The tool as is claim 16 wherein each cutter includes a second line of laser cladding formed from said high speed steel alloy and extending along first line of laser cladding, a second metallurgical bond between the first and second lines of laser cladding, and a third metallurgical bond between said second line of laser cladding and the cutting portion.

18. The tool as in claim 17 wherein each cutter includes a third line of laser cladding formed from said high speed steel alloy and extending along said first and second lines of laser cladding a distance above the bonding surface and including a fourth metallurgical bond between said third line of laser cladding and either or both of said first and second lines of laser cladding.

19. The tool as in claim 18 wherein said formed surfaces and cutting edges extend along and generally parallel to said lines of laser cladding, at least one of said formed surfaces extending along said third line of laser cladding.

20. The tool as in claim 16 wherein said mounting portion has a Rockwell C hardness of from about 20 to about 23 and said high speed alloy has a Rockwell C hardness greater than about 63.

21. The tool as in claim 16 including abrasive particles in said high speed steel alloy, said alloy comprising a matrix for the particles, said cladding having a hardness greater than 1,500 Vickers.

22. The tool as in claim 21 wherein said particles are formed from a carbide and said laser cladding having a hardness of between about 1,500 and about 2,500 Vickers.

23. The tool as in claim 21 including diamond particles in the laser cladding and said laser cladding having a hardness greater than about 2,500 Vickers.

24. The tool as in claim 16 wherein said cladding has a thickness from about 0.01 inch to about 0.02 inch.

25. The tool as in claim 16 wherein said tool body is rotary and defines a rotational axis, said mounting portion is cylindrical and extends along said axis.

26. The tool as in claim 25 wherein said tool body comprises a reamer, said cutting portion includes a plurality of flutes and lands extending alternately around said axis away from the mounting portion, bonding surfaces on the lands, said metal cutters each extending along a bonding surface generally parallel to said axis with a cutting edge located on one side of each land, all of said cutting edges facing in one circumferential direction.

27. The tool as in claim 26 including expansion slots in said tool body located in said valleys between adjacent lands and including a mandrel engageable said lands to move the cutters radially outwardly.

28. The tool as in claim 16 wherein said tool body comprises one of a center bore, a broach, a center drill, a twist drill, an end mill, an expansion reamer, and a non-expansion reamer.

29. The tool as in claim 15 wherein said tool body comprises one of: a center bore, a center drill, a twist drill, an end mill, an expansion reamer and a non-expansion reamer.

30. The tool as in claim 8 wherein each cutting edge extends helically along and around the axis.

31. The tool as in claim 8 wherein each cutting edge extends parallel to the axis.

32. The tool as in claim 8 wherein each cutter is free of voids and includes a plurality of lines of laser cladding and including second metallurgical bonds between adjacent lines of laser cladding.

33. The method as in claim 32 wherein each cutter includes layers of lines of laser cladding and third metallurgical bands between cladding lines in adjacent layers.

34. The tool as in claim 32 wherein said second hardness is greater than about 63 Rockwell C.

35. The tool as in claim 32 including abrasive particles in the laser cladding.

36. The tool as in claim 35 wherein said second hardness is greater than about 1,500 Vickers.

37. The tool as in claim 32 including carbide particles in the laser cladding.

38. The tool as in claim 32 including diamond particles in the laser cladding.

39. The tool as in claim 8 wherein said laser cladding includes a number of layers of lines of cladding, second metallurgical bonds joining said lines of laser cladding together and the cladding is free of voids.

* * * * *